(12) United States Patent
Yamaoka

(10) Patent No.: US 6,280,594 B1
(45) Date of Patent: Aug. 28, 2001

(54) DEVICE FOR PRODUCING ION WATER AND PARTITION WALL FOR DEVICE FOR PRODUCING ION WATER

(76) Inventor: Tateki Yamaoka, 1217-3 Yamazaki-cho, Machida-shi, Tokyo (JP)

(*) Notice: Subject to any disclaimer, the term of this patent is extended or adjusted under 35 U.S.C. 154(b) by 0 days.

(21) Appl. No.: 09/203,652

(22) Filed: Dec. 1, 1998

(51) Int. Cl.[7] .................................................. B01D 61/44
(52) U.S. Cl. .......................... 204/633; 204/257; 204/263; 204/269
(58) Field of Search .................................... 204/257, 263, 204/269, 633

(56) References Cited

U.S. PATENT DOCUMENTS 4,210,502 * 7/1980 Watanabe et al. .................... 205/749

* cited by examiner

*Primary Examiner*—Arun S. Phasge
(74) *Attorney, Agent, or Firm*—Jordan and Hamburg LLP

(57) ABSTRACT

A device for producing ion water comprises an electrolytic cell which can be electrolyzed; two ion exchange units which are disposed ion exchange membrane such that the electrolytic cell is partitioned in three electrolytic chambers therein respectively; an anode electrode which is provided in an intermediate electrolytic chamber of the electrolytic cell; and a cathode electrode which is provided in the electrolytic chambers located on both sides of the electrolytic cell respectively, the cathode electrode being flowed half amount of an electric current which is flown to the anode electrode therein respectively, so that the desired pH of the ion can be controlled because the generative quantity of hydrogenous ion can be balanced by controlling the quantity of electricity of turning on electricity.

10 Claims, 16 Drawing Sheets

DEVICE FOR PRODUCING ION WATER AND PARTITION WALL FOR DEVICE FOR PRODUCING ION WATER

BACKGROUND OF THE INVENTION

The present invention is related to a device for producing ion water and partition wall for device for producing ion water which generates alkaline functional water (alkaline ion water) for healthy promotion and medical water (acid ion water) for sterilization or the like due to electrolyze water.

Formerly, device of electrolysis of water is composed of an electrolytic cell which is arranged an ion exchange membrane at the central portion thereof; an anode electrode disposed into one of electrolytic chambers in the electrolytic cell; and a cathode electrode disposed into another electrolytic chamber in the electrolytic cell, and the electrolyzing of water is operated by the above-mentioned device.

By the conventional electrolysis using the ion exchange membrane, most electric charge movements are performed by movement of cation to a cathode electrode from anode electrodes. Further, in order not to cause contrary movement of hydroxide ion, a fall of pH of the acid ion water which has formed by the anode chamber is promoted markedly.

In addition, when it is electrolyzed by equivalent quantity of water, pH of alkaline ion water in a reaction on the side of cathode chamber is raised.

SUMMARY OF THE INVENTION

In view of the foregoing, it is an object of the present invention to provide a device for producing ion water that pH of the ion water which is turned into a goal can be controlled in order to take balance of hydrogenous-ion generative quantity by control of an amount of electricity of turning on electricity because an amount of turning on electricity is reduced be half It is another object of the present invention to provide a device for producing ion water that the water which was introduced into the electrolytic cell can electrolyze it on pure ion water. Furthermore, it is still another object of the present invention to provide a device for producing ion water that the ion water raised ion density can be also produced.

The novel features which are believed to be characteristic of the invention, both as to its organization and method of operation, together with further objects and advantages thereof, will be better understood from the following description considered in connection with accompanying drawings in which a presently preferred embodiment of the invention is illustrated by way of example. It is to be expressly understood, however, that the drawings are for the purpose of illustration and description only, and are not intended as a definition of the limits of the invention.

DESCRIPTION OF THE PREFERRED EMBODIMENT

Figure 1:
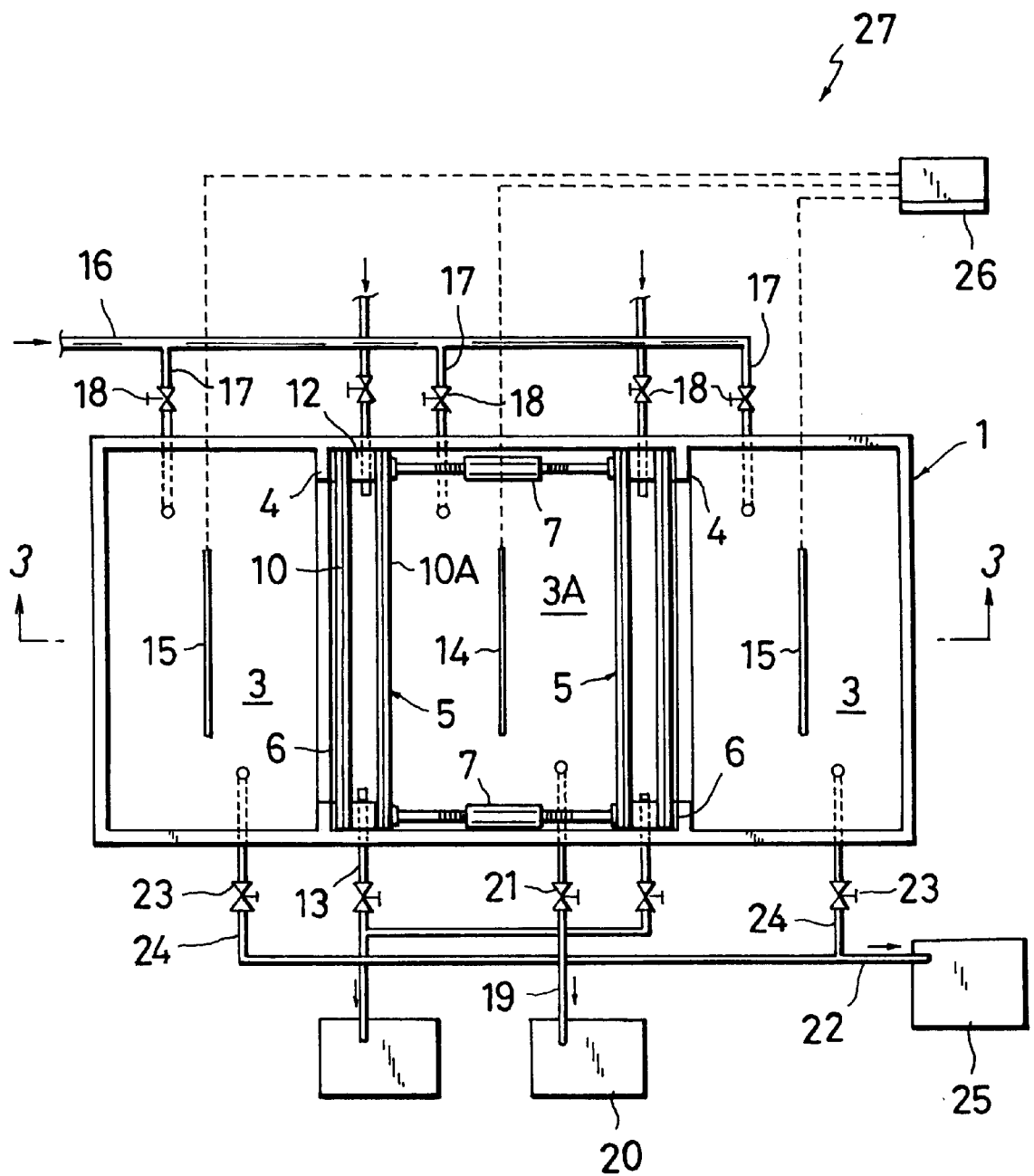
FIG. 1 is a plan view showing a first embodiment of the present invention.
Figure 2:
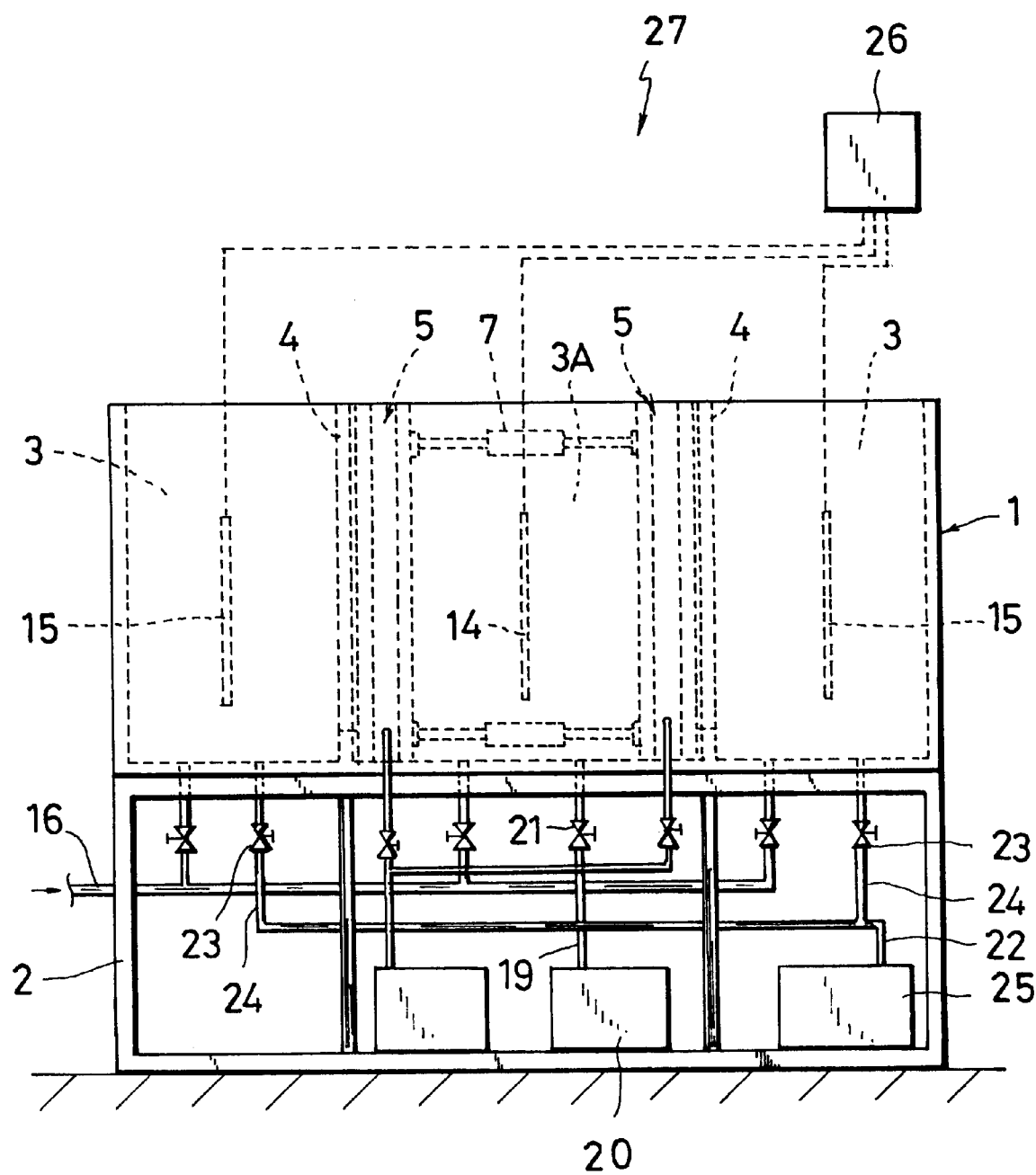
FIG. 2 is a front view showing a first embodiment of the present invention.
Figure 3:
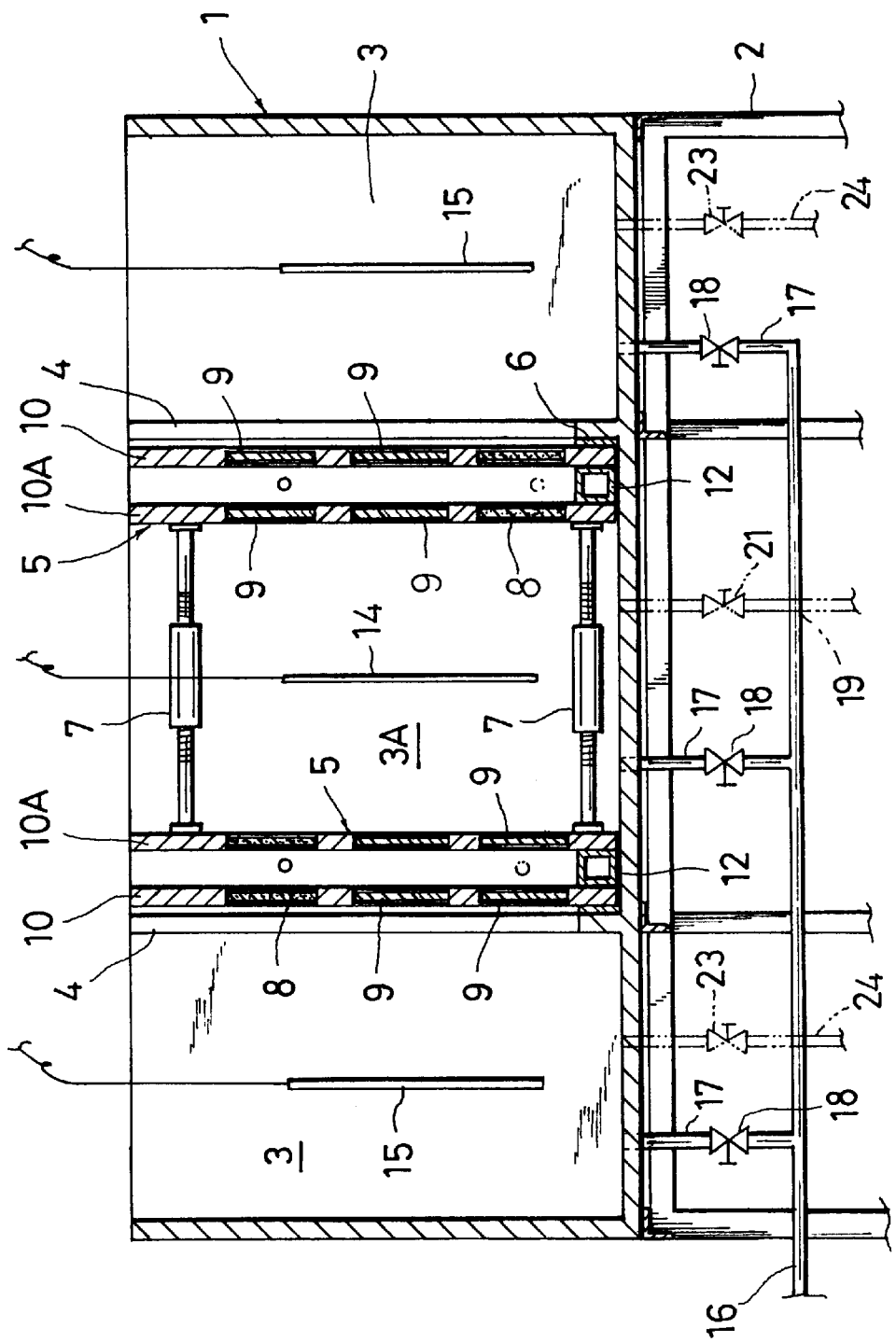
FIG. 3 is an expanded cross sectional view taken along the line 3—3 of FIG. 1.

FIGS. 1 to 7 illustrate in a first embodiment of the present invention, and numeral 1 is an electrolytic cell which can electrolyze the water which is established in the upper part of opportunity frame 2. Support members 4, 4 are formed at an inner wall surface of the electrolytic cell 1 such that the electrolytic cell 1 is partitioned on three pieces of electrolytic chambers 3, 3A, 3.

Figure 4:
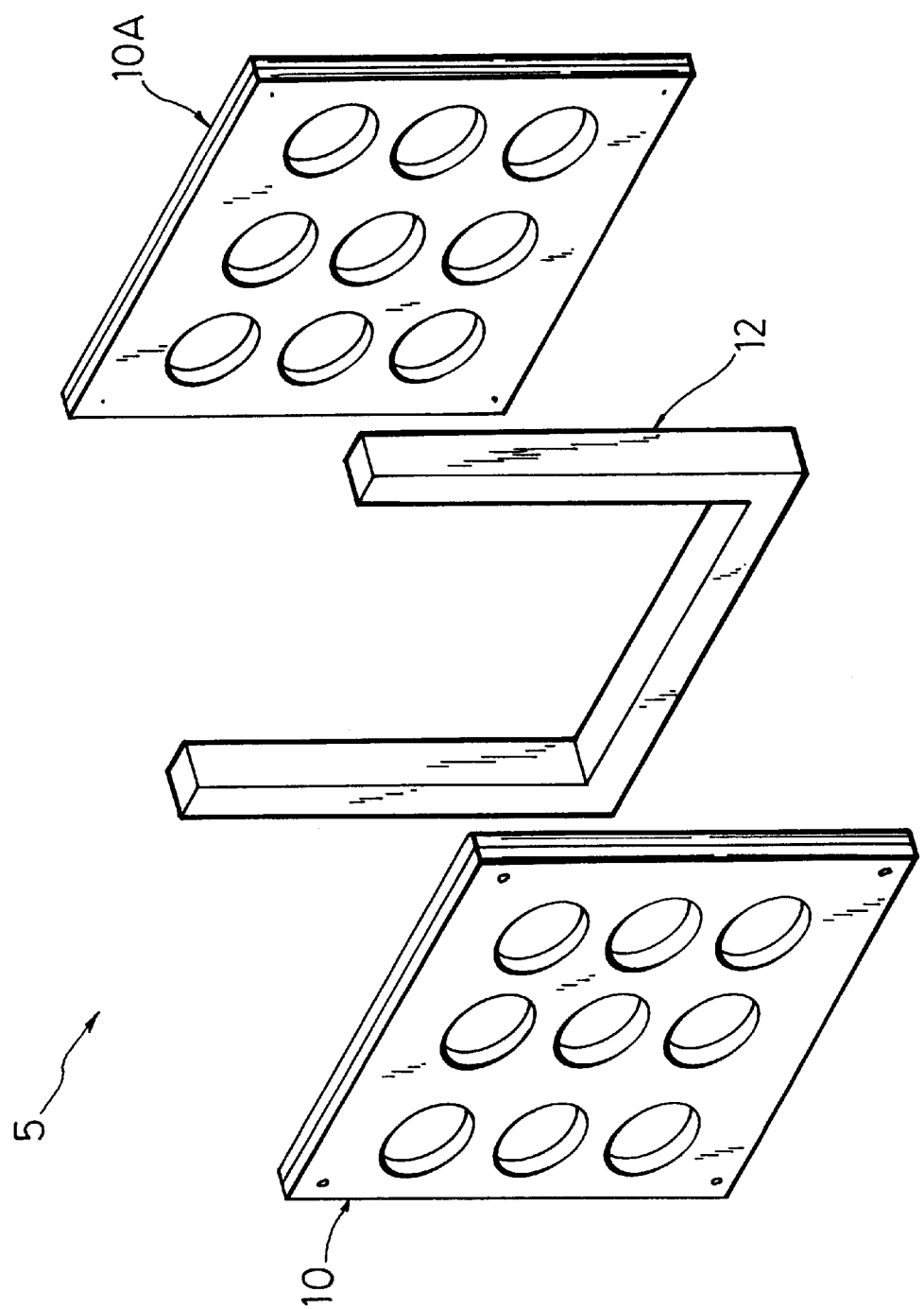
FIG. 4 is an exploded perspective view of an ion-exchange unit showing a first embodiment of the present invention.
Figure 5:
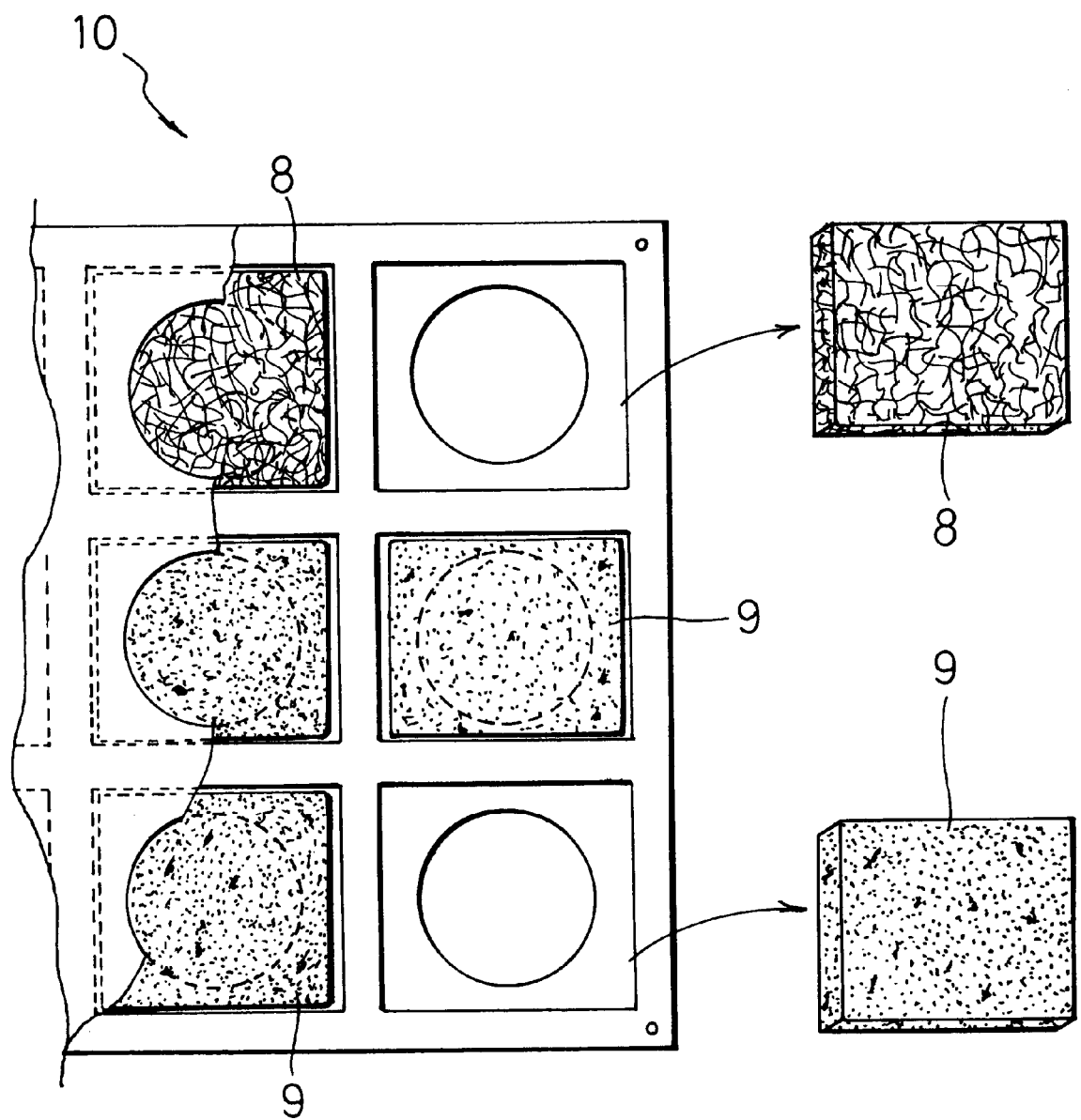
FIG. 5 is a partial cut-off explanation view of a partition wall according to a first embodiment of the present invention.
Figure 6:
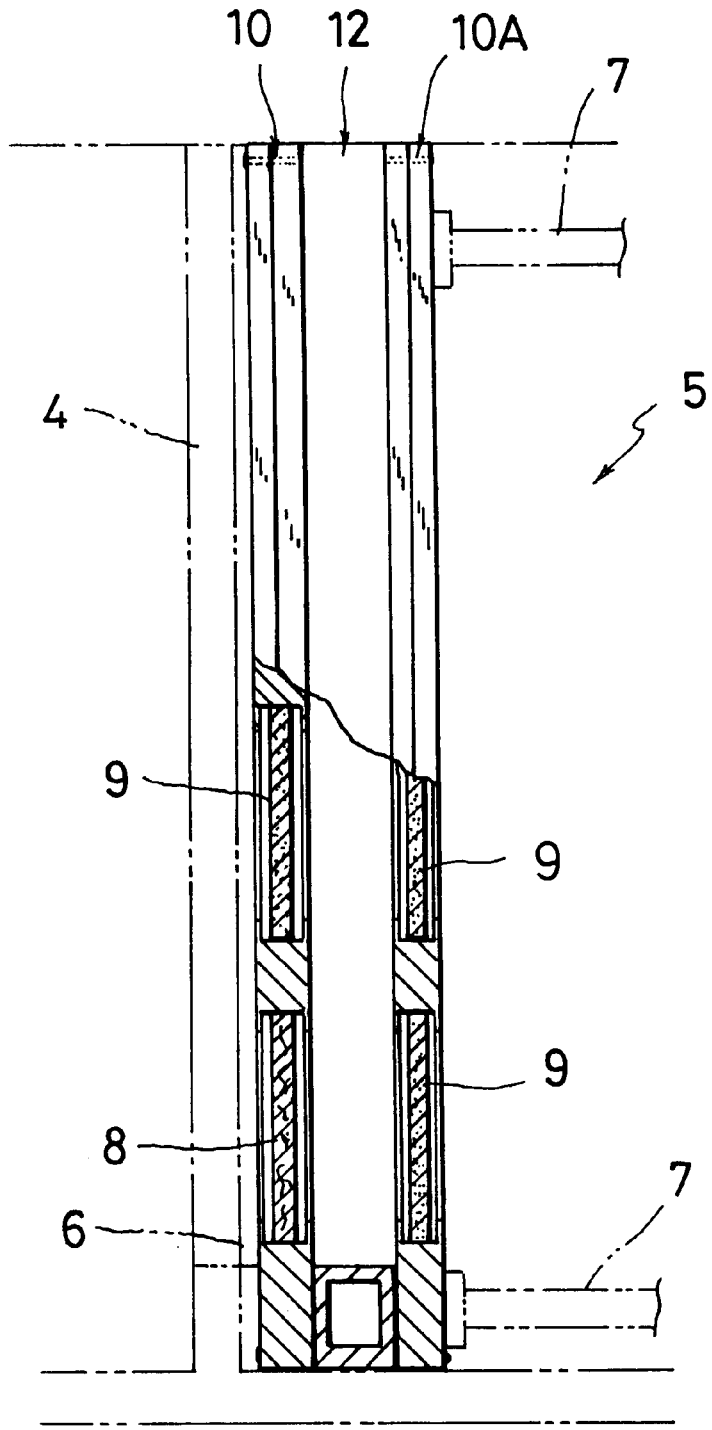
FIG. 6 is a partial cut-off explanation view showing an ion-exchange unit according to a first embodiment of the present invention.
Figure 7:
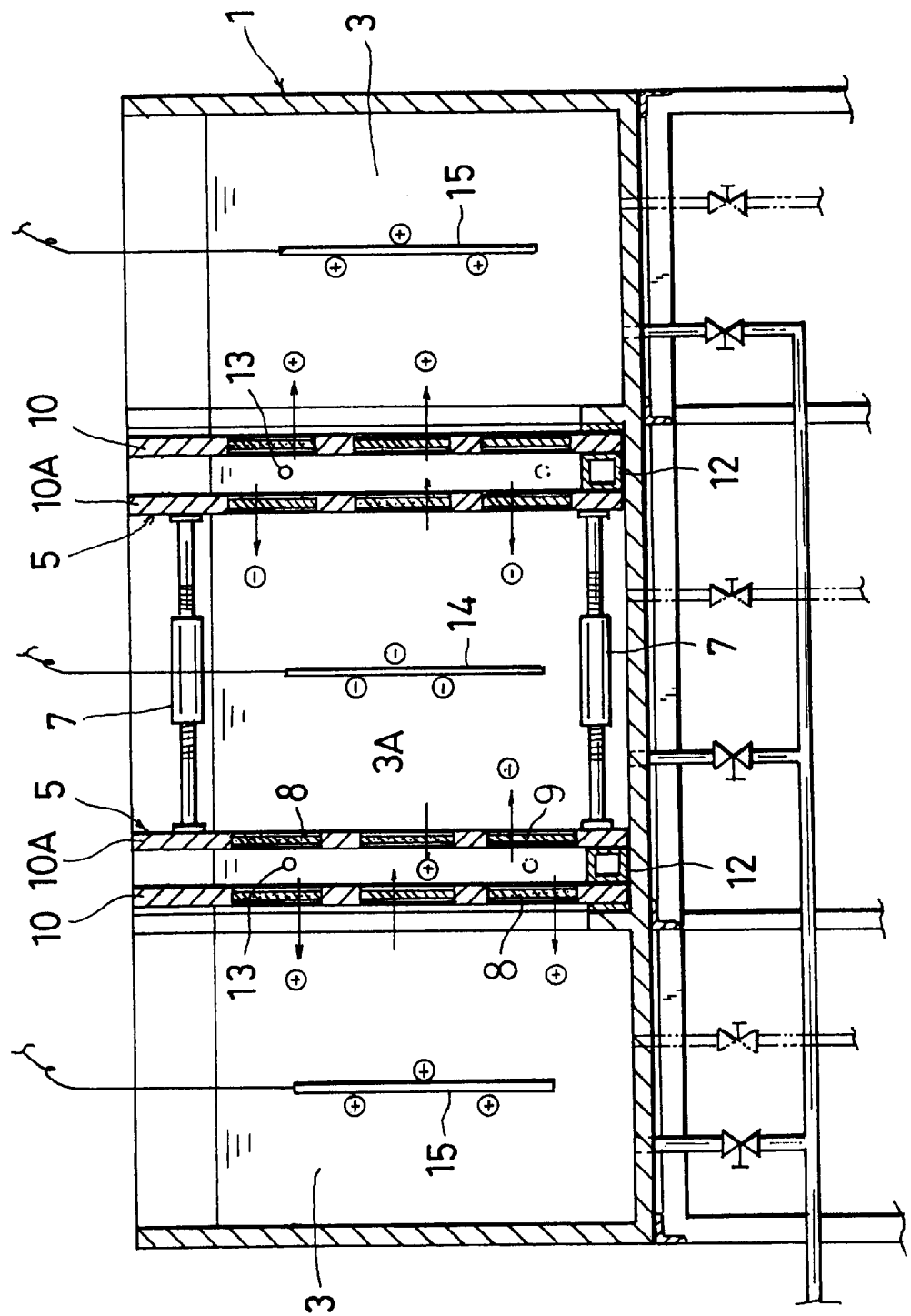
FIG. 7 is an explanation view during an electrolyzing according to a first embodiment of the present invention.

Numeral 5, 5 are ion-exchange units which are fixed by pressure by press tools 7, 7, 7 and 7 using four pieces of turnbuckle mechanism via seal materials 6, 6 on the support members 4, 4 which partition the electrolytic cell 1 on three pieces of the electrolytic chambers 3, 3A, 3. The ion exchange unit 5, 5 as illustrated in FIGS. 4 to 6 are composed of a pair of partition walls 10, 10A; a framed body 12; and a water supply equipment 13. The partition walls 10, 10A are attached a plurality of anode exchange membranes 8 and a plurality of cathode exchange membranes 9 thereto, the partition walls 10, 10A being which are supported by support members 4,4 thereto. The framed body 12 is to form a water chamber 11 between the partition walls 10, 10A. The water supply equipment 13 is discharged water or drinking water while they are supplied to the water room 11 within the framed body 12.

Numeral 14 is an anode electrode which is performed plating of platinum for the titanium board and is established within the intermediate electrolytic chamber 3A of the electrolytic cell 1.

Numeral 15, 15 are cathode electrodes which are established within the electrolytic chambers 3, 3 on both sides of the electrolytic cell 1 and are performed plating of platinum for the titanium board, the cathode electrodes 15, 15 being flown half an electric current of the electric current which flows to the anode electrode 14 each thereto, respectively.

Numeral 16 is a separated water supplying equipment which supplies drinking water such as the water-service water or the like which is electrolyzed to each electrolytic chamber 3, 3A, 3 of the electrolytic cell 1 by branch pipes 17, 17, 17. The branch pipes 17, 17, 17 of the separated water supplying equipment 16 have opening and shutting valves 18, 18, 18 which are interposed between the branch pipes 17 and the separated water supplying equipment 16 respectively.

Numeral 19 is an acid ion water drainpipe having an opening and shutting valve 21 which drains the pure acid ion water generated by the intermediate electrolytic chamber 3A of the electrolytic cell 1 to an acid ion water storage tank 20.

Numeral 22 is an alkaline ion water drainpipe which drains the pure alkaline ion water generated by the electrolytic chambers 3, 3 on both sides into the electrolytic cell 1 to an alkaline ion water storage tank 25 via the branch pipes 24, 24 having opening and shutting valves 23, 23.

Numeral 26 is a voltage controlling device which controls the voltage to supply the amount of a desired electric current to the anode electrode 14 and the cathode electrodes 15, 15.

A device for producing ion water 27 of the above-mentioned structure opens the opening and shutting valves 18, 18, 18 of the separated water supplying equipment 16, supplies a predetermined quantity of drinking water into the electrolytic chambers 3, 3A respectively, and closes the opening and shutting valves 18, 18, 18. In addition, water is supplied to the water chambers 11, 11 by the water supplying equipments 13, 13 of the ion exchange units 5, 5.

Afterward, an electric current is flown to the anode electrode 14 and the cathode electrodes 15, 15 in a fixed time, and it is electrolyzed.

Then, the anion and cation which moved electric charge by an electrolysis reaction separate by the cation exchange membrane and the anion exchange membranes, and they are picked thereby. As illustrated in FIG. 6, the cation of the separated water in the intermediate electrolytic chamber 3A, having the anode electrode 14, of the electrolytic cell 1 passes the plurality of cation exchange membranes 8, 8 of a pair of partition walls 10, 10A which are provided on two ion exchange units 5, 5. The cation is introduced into the electrolytic chambers 3, 3, having the cathode electrodes 15, 15, which are provided at both sides into the electrolysis cell 1.

Moreover, the anion of the separated water of the electrolytic chambers 3, 3, having the cathode electrodes 15, 15, which are provided at both sides into the electrolytic cell 1 passes through the plurality of the anion exchange membranes 9, 9 of the pair of partition walls 10, 10A of two ion exchange units 5, 5. The anion is introduced into the electrolytic chamber 3A, having the anode electrode 14, which is provided at the central portion of the electrolytic cell 1.

In addition, the cation of water-service water and the drinking water which is supplied to the water chambers 11, 11 respectively located between the pair of partition walls 10, 10A and 10, 10A of the ion exchange units 5, 5 is introduced into the electrolytic chambers 3, 3 at both sides in the electrolytic cell 1. The anion is introduced into the intermediate electrolytic chamber 3A, and ion density is raised. Then, pure acid ion water of pH at the rate 3.0 to 3.2 is generated in the intermediate electrolytic chamber 3A, pure alkaline ion water of pH at the rate 9.2 to 9.7 is also generated by the electrolytic chambers 3, 3 at both sides in the electrolytic cell 1.

When acid ion and alkaline ion water are generated in this way, the opening and shutting valve 21 of the acid ion water drainpipe 19 is opened, and the acid ion water is stored on the acid ion water storage tank 20. Also the opening and shutting valve 23 of the alkaline ion water drainpipe 22 is opened and the alkaline ion water is stored it up the alkaline ion water storage tank 25.

Furthermore, the water which is passed by two pieces of ion exchange units 5, 5 can use as the spare water to produce pure water.

DIFFERENT PREFERRED EMBODIMENTS OF THE INVENTION

Other embodiments of the present invention will now be described referring to FIGS. 8 to 19. Throughout the drawings of the embodiments, like components are denoted by like numerals as of the first embodiment and will not therefore be explained in greater detail.

Figure 8:
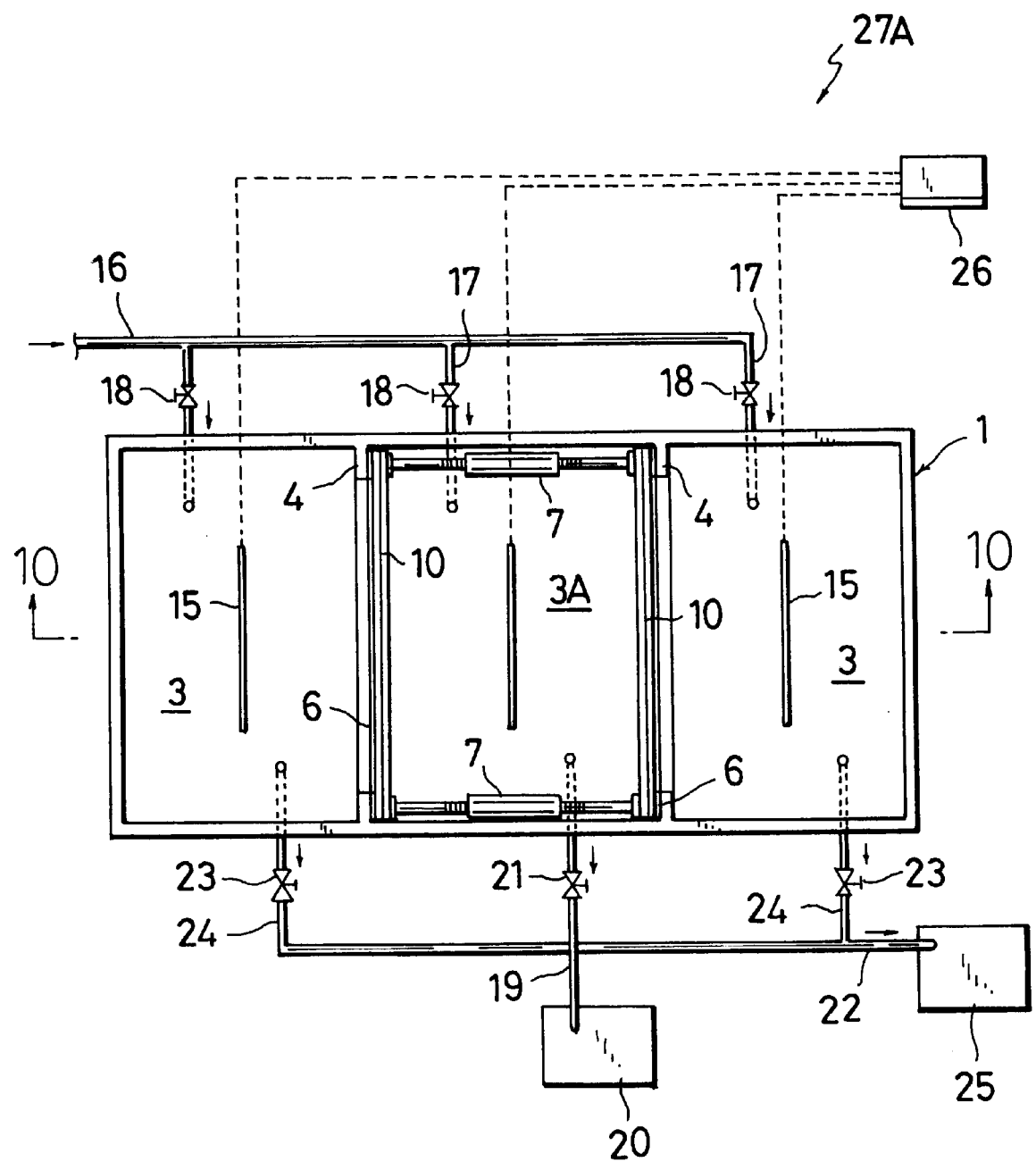
FIG. 8 is a plan view showing a second embodiment of the present invention.
Figure 9:
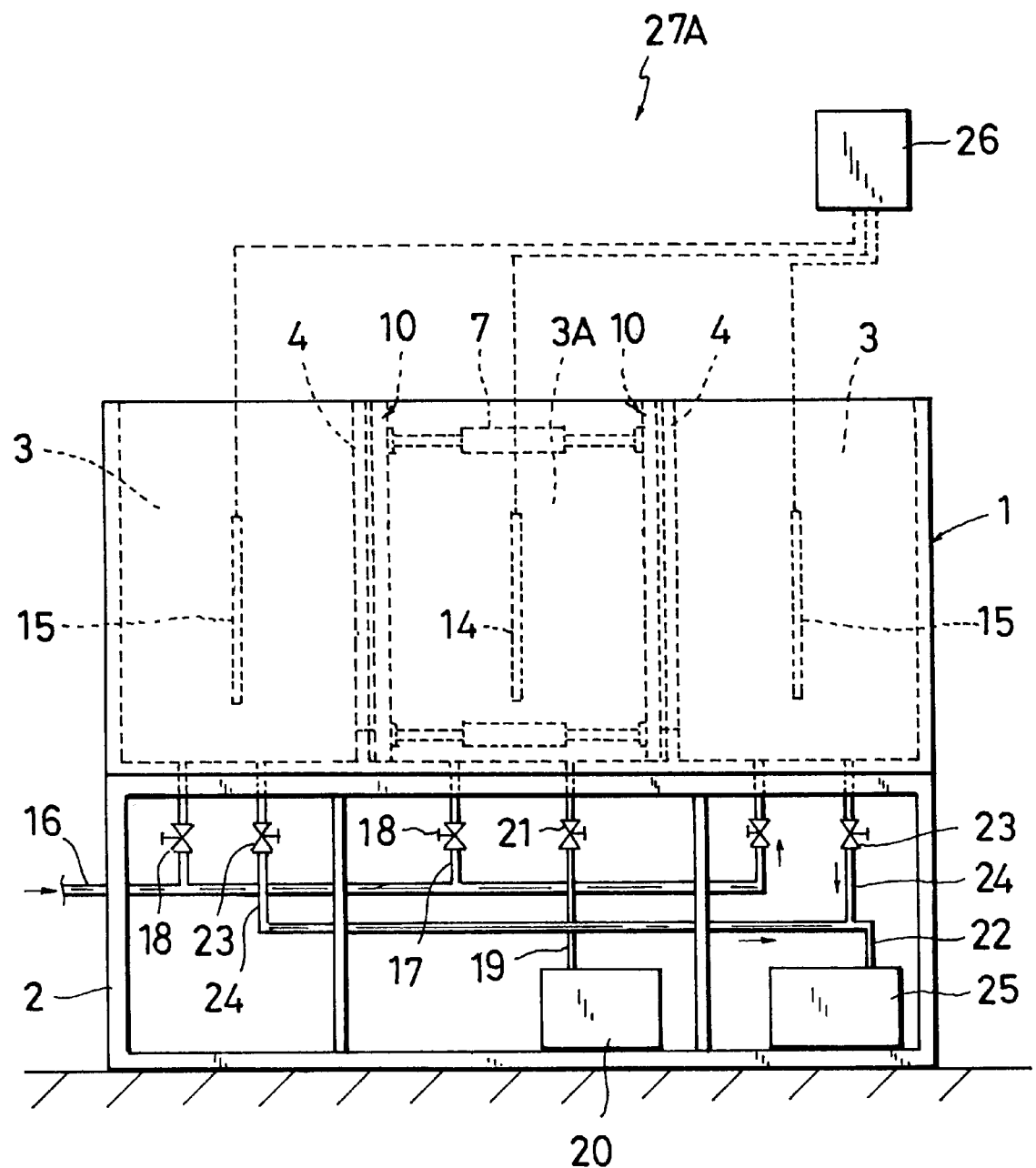
FIG. 9 is a front view showing a second embodiment of the present invention.
Figure 10:
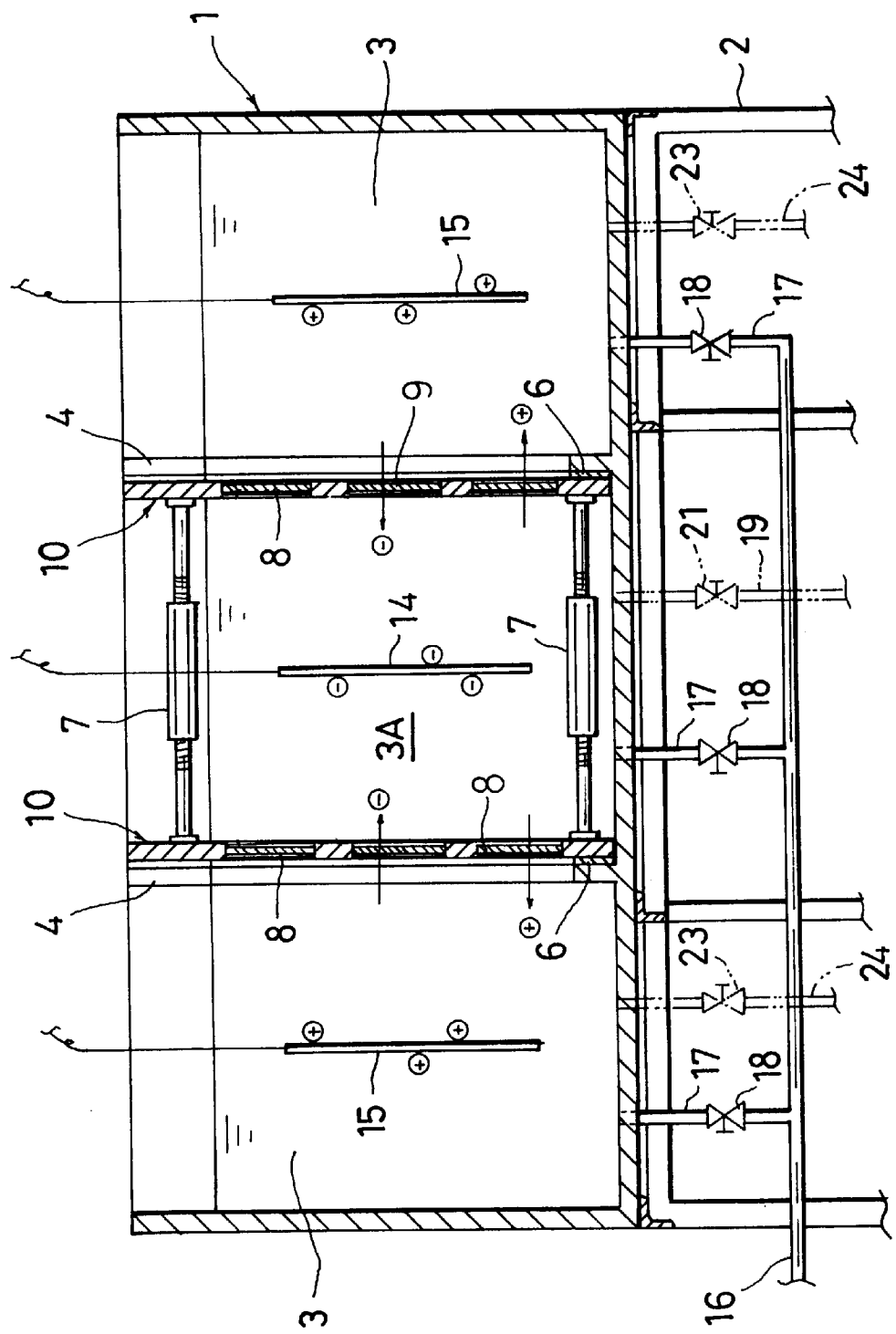
FIG. 10 is an expanded cross sectional view taken along the line 10—10 of FIG. 8.
Figure 11:
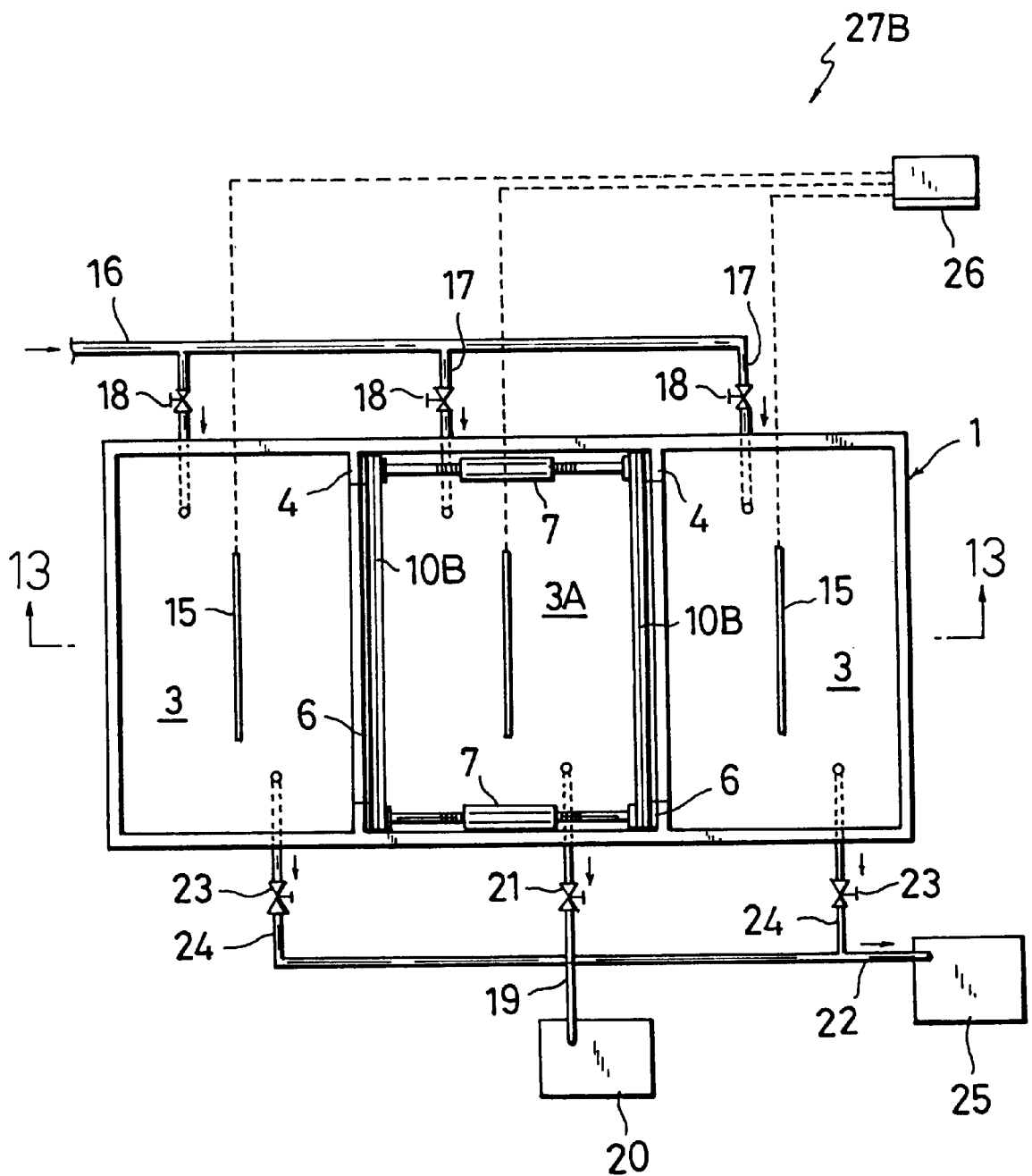
FIG. 11 is a plan view showing a third embodiment of the present invention.
Figure 12:
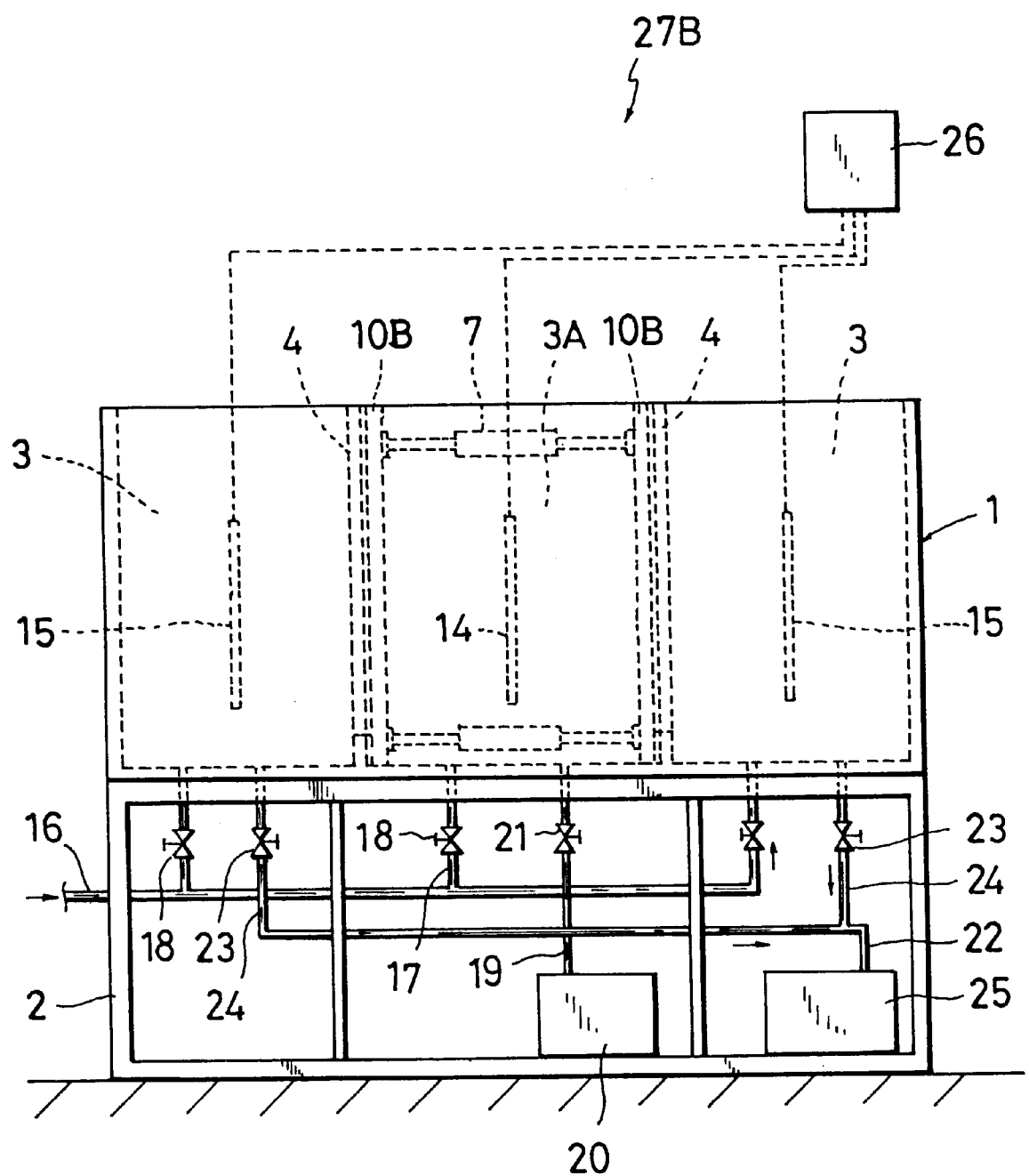
FIG. 12 is a front view showing a third embodiment of the present invention.
Figure 13:
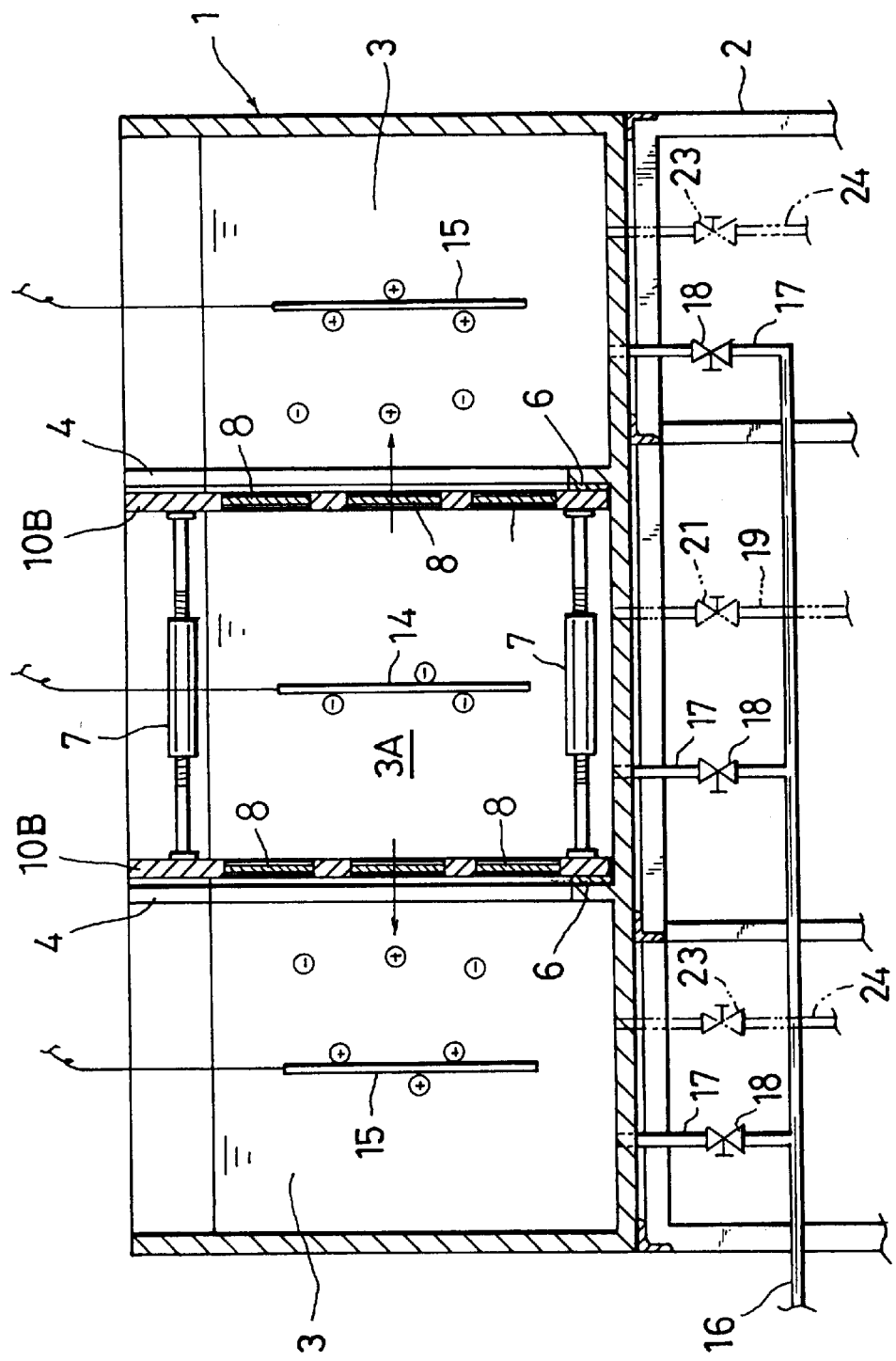
FIG. 13 is an expanded cross sectional view taken along the line 13—13 of FIG. 11.

FIGS. 8 to 10 illustrate the second embodiment of the present invention which is distinguished from the first embodiment by the fact that the partition walls 10, 10A as two ion exchange units are used in order to partition the electrolytic cell 1 on 3 pieces of electrolytic chambers 3, 3A, 3. Ion density may not get better, however, a device for producing ion water 27A according to the second embodiment will provide the same function as of the first invention FIGS. 11 to 13 illustrate the third embodiment of the present invention which is distinguished from the first embodiment by the fact that the partition wall 10 is replaced with another like partition wall 10B. The partition walls 10B, 10B as an ion exchange unit which are attached only a cation exchange membrane or an anion exchange membrane thereto are used. A device for producing ion water 27B according to the third embodiment may be composed like this.

Figure 14:
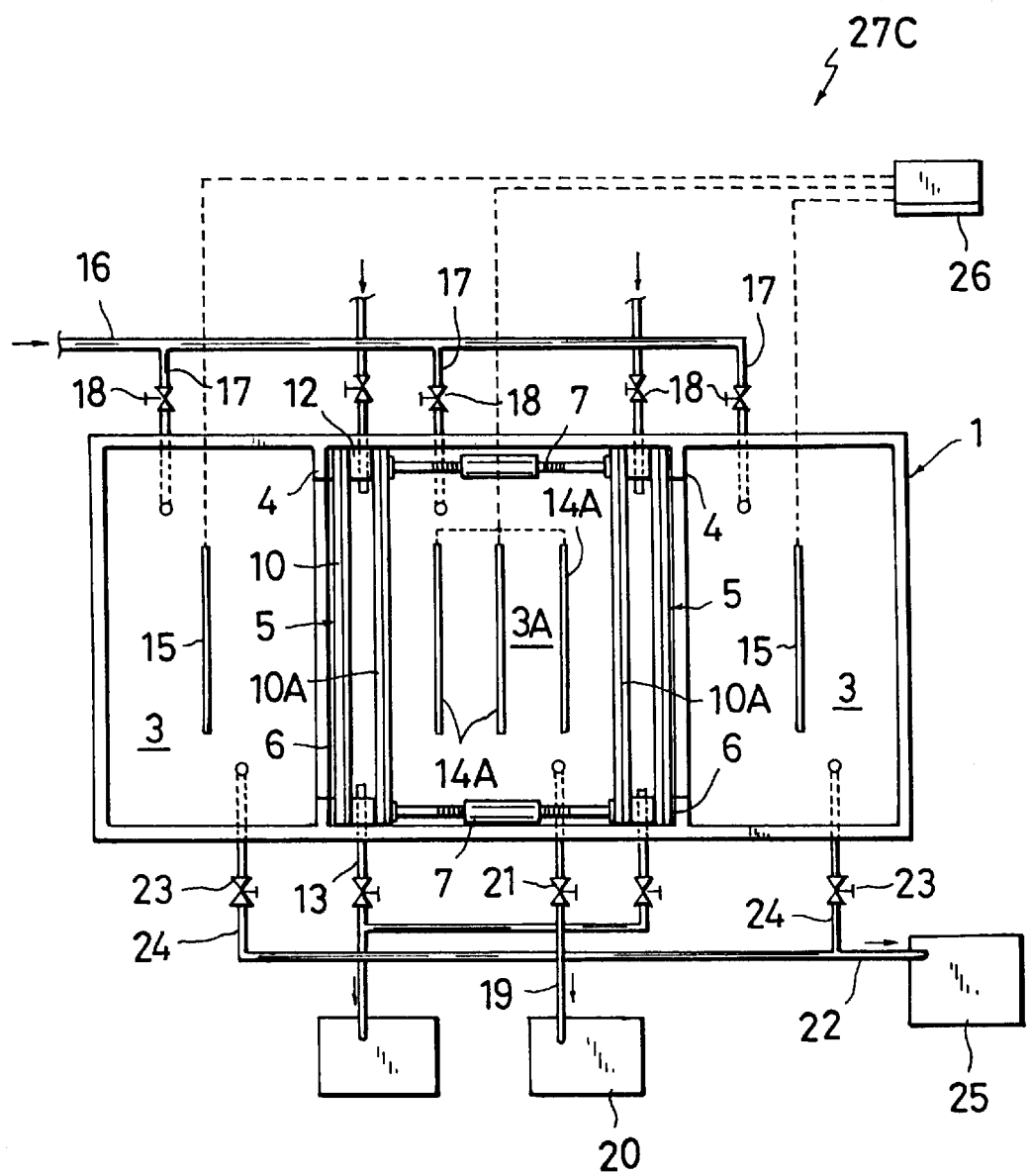
FIG. 14 is a plan view showing a fourth embodiment of the present invention.
Figure 15:
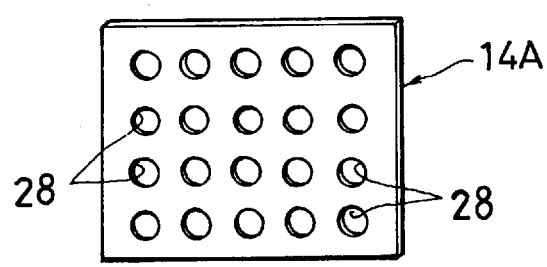
FIG. 15 is an explanation view of an anode electrode showing a fourth embodiment of the present invention.

FIGS. 14 and 15 illustrate the fourth embodiment of the present invention which is distinguished from the first embodiment by the fact that at least two or more anode electrodes, three pieces of anode electrodes 14A, 14A, 14A in this embodiment of the present invention, which are performed plating of platinum for the titanium plate, having a plurality of holes 28, is made to stand in a row at a predetermined interval into the intermediate electrolytic chamber 3A of the electrolytic cell 1. Then, a rate of turning on electricity gets better due to compose of the above-mentioned structure. Moreover, it can be used on electrolysis of water including heavy metal. Also ion can move through the plurality of holes 28 of the anode electrodes 14A, 14A, 14A, and a device for producing ion water 27C can produce strong acid ion water and strong alkaline ion water easily.

Figure 16:
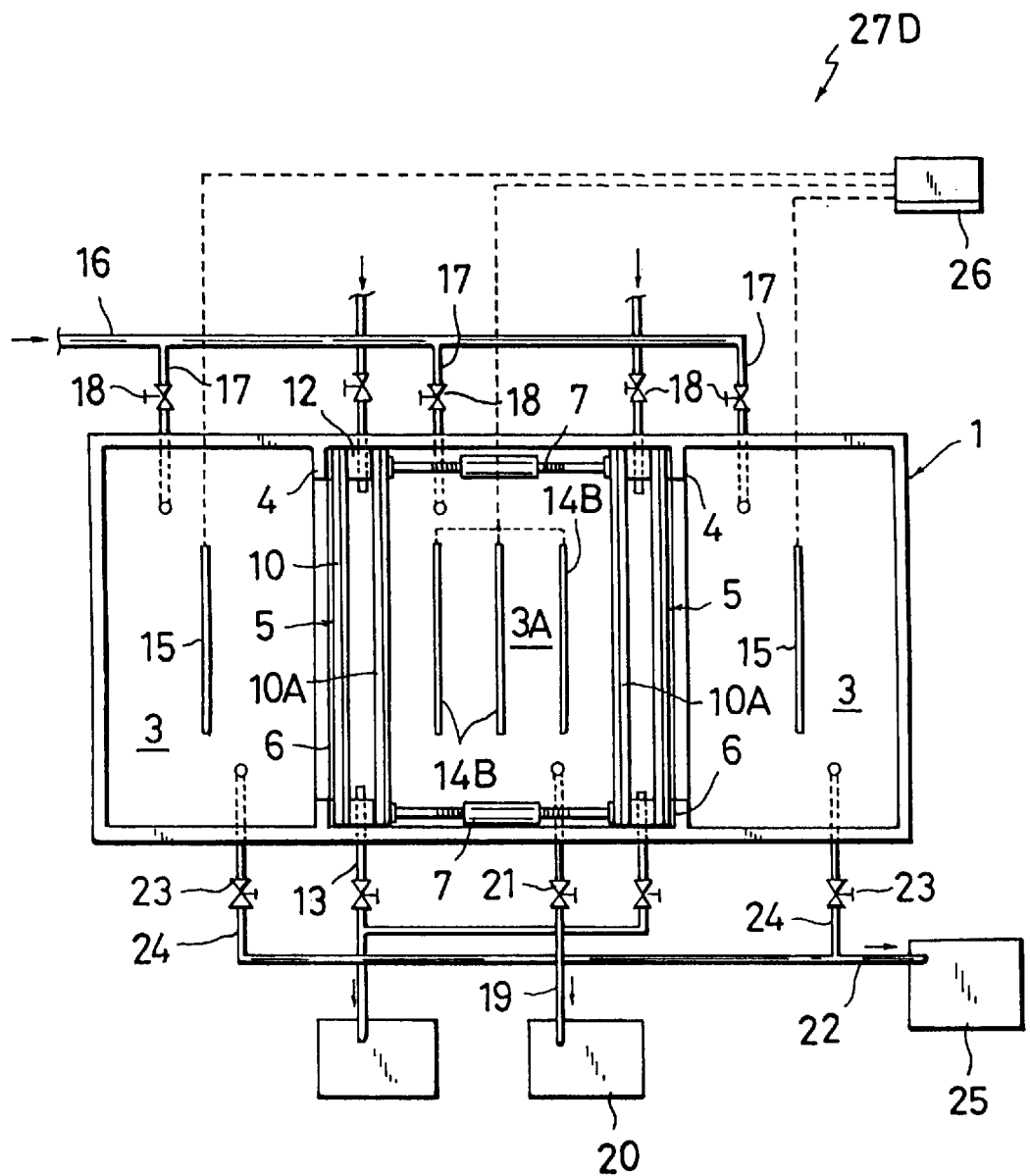
FIG. 16 is a plan view showing a fifth embodiment of the present invention.
Figure 17:
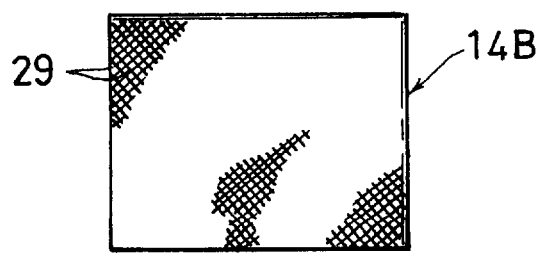
FIG. 17 is an explanation view of an anode electrode showing a fifth embodiment of the present invention.

FIGS. 16 and 17 illustrate the fifth embodiment of the present invention which is distinguished from the fourth embodiment by the fact that at least two or more anode electrodes, three anode electrodes 14B, 14B, 14B in this embodiment of the present invention, which are woven and knitted a linear material 29 which is performed plating of platinum for a titanium plate and is formed on a mesh are made to stand in a row at a predetermined interval into the intermediate electrolytic chamber 3A of the electrolytic cell 1. A device for producing ion water 27D according to the fifth embodiment will provide the same function as of the fourth invention.

Figure 18:
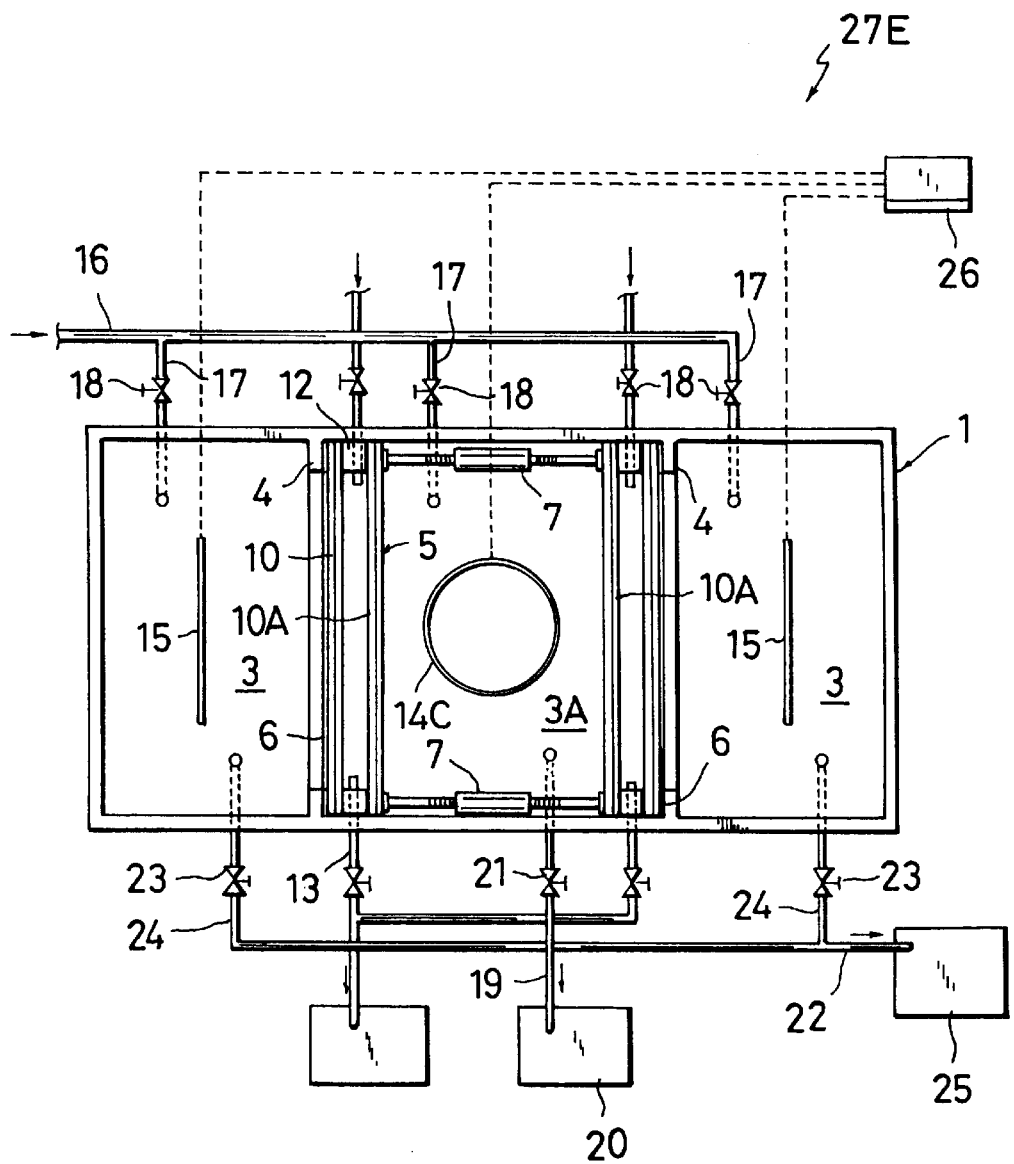
FIG. 18 is a plan view showing a sixth embodiment of the present invention.
Figure 19:
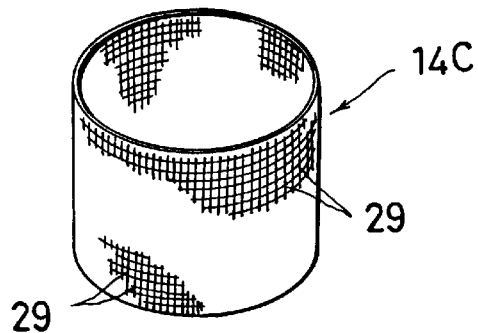
FIG. 19 is an explanation view of an anode electrode showing a sixth embodiment of the present invention.

FIGS. 18 and 19 illustrate the sixth embodiment of the present invention which is distinguished from the fourth embodiment by the fact that an anode electrode 14C is woven and knitted a line material 29 which is performed plating of platinum for a titanium plate, the anode electrode being formed on a mesh and in the shape of a cylinder, and the anode electrode being provided into the intermediate electrolytic chamber 3A of the electrolytic cell 1. A device for producing ion water 27E according to the sixth embodiment will provide the same function as of the fourth invention.

ADVANTAGES OF THE INVENTION

As set forth above, the advantages of the present invention are as follows:

(1) A device for producing ion water comprises an electrolytic cell which can be electrolyzed; two ion exchange units which are disposed ion exchange membrane such that the electrolytic cell is partitioned in three electrolytic chambers therein respectively; an anode electrode which is provided in an intermediate electrolytic chamber of the electrolytic cell; and a cathode electrode which is provided in the electrolytic chambers located on both sides of the electrolytic cell respectively, the cathode electrode being flowed half amount of an electric current which is flown to the anode electrode therein respectively, so that the generative quantity of hydrogenous ion can be balanced by controlling the quantity of electricity of turning on electricity.

Therefore, the desired pH of the ion can be controlled.

(2) As discussed above, an anion and cation which moved electric charge by an electrolysis reaction can be separated and picked by the ion exchange membrane.

(3) As discussed above, structure is simple so that it can be carried into effect easily.

(4) Since a cation exchange membrane and an anion ion exchange membrane are respectively provided for two partition walls, it can be generated on pure acid ion water and alkaline ion water.

(5) The quantity of turning on electricity is made to increase by the water which is supplied to two ion exchange units, and the balance regulation of promotion or fall of the generative quantity of hydrogenous ion or a fall may be controlled, and a density of ion can be raised.

(6) By using at least two or more anode electrodes which are formed the plurality of holes or formed on a mesh and in the shape of a cylinder, a rate of turning on electricity gets better, and it can be used on electrolysis of the water including heavy metal. Also ion may move by an anode electrode, and strong acid ion water and strong alkaline ion water can be produced easily.

What is claimed is:

1. A device for producing ion water comprising: an electrolytic cell,
    two ion exchange units in each of which are disposed a cation exchange membrane and an anion exchange membrane such that the electrolytic cell is partitioned into three elecrolytic chambers therein;
    means for securing each of said ion exchange units in a fixed position;
    an anode which is provided in an intermediate electrolytic chamber of said electrolytic cell; and
    two cathodes which are respectively provided in the electrolytic chambers located on both sides of said electrolytic cell, each cathode receiving half the amount of electric curt flowing through said anode.

2. The device of claim 1, each ion exchange unit further comprising a partition wall assembly including a pair of partition walls, one having a cation exchange membrane and the other an anion exchange membrane; a water chamber provided between the partition walls; and means for supplying water to the water chamber to increase ion density.

3. The device of claim 1, wherein said anode is a platinum plated titanium element.

4. The device for of claim 1, wherein said anode electrode is a platinum plated titanium element.

5. The device of claim 1, wherein said anode is woven or knitted from a platinum plated titanium linear material.

6. The device of claim 1, wherein said cathode is a platinum plated titanium element.

7. A device for producing ion water comprising
    electrolytic cell;
    two ion exchange units in each of which are disposed a cation exchange membrane and an anion exchange membrane such that the elelytic cell is partitioned into three electrolytic chambers;
    means for securing each of said ion exchange units in a fixed position;
    two or more anodes positioned in a row at predetermined intervals in the intermediate electrolytic chamber of the electrolytic cell, said anodes each in the form of a plate, having a plurality of holes or a linear material in the shape of a mesh; and
    a cathode provided in each of the electrolytic chambers located on both sides of said electrolytic cell, each cathode receiving half the amount of electrode current flowing through said anodes.

8. The device of claim 7 wherein the ion exchange unit further comprises a partition wall assembly including a pair of partition walls one having a cation exchange membrane and the other an anion exchange membrane, a water chamber provided between the partition walls and means for supplying water to the water chamber in order to increase ion density.

9. The device of claim 7, wherein the anode is a platinum plated titanium plate having a plurality of holes.

10. The device of claim 7, wherein the anode is a woven or knitted platinum plated titanium linear material.

* * * * *